United States Patent
Lv et al.

(10) Patent No.: US 9,875,207 B2
(45) Date of Patent: Jan. 23, 2018

(54) REMOTE TERMINAL UNIT (RTU) HARDWARE ARCHITECTURE

(71) Applicant: Honeywell International Inc., Morristown, NJ (US)

(72) Inventors: Jie Lv, Shanghai (CN); Lei Zou, Shanghai (CN); Zhi Yang, Shanghai (CN); Min Zhang, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 308 days.

(21) Appl. No.: 14/459,557

(22) Filed: Aug. 14, 2014

(65) Prior Publication Data

US 2016/0048474 A1    Feb. 18, 2016

(51) Int. Cl.
| | | |
|---|---|---|
| *G06F 3/00* | (2006.01) | |
| *G06F 5/00* | (2006.01) | |
| *G06F 13/00* | (2006.01) | |
| *G06F 13/40* | (2006.01) | |
| *G06F 13/10* | (2006.01) | |
| *G02B 6/36* | (2006.01) | |
| *G06F 13/14* | (2006.01) | |

(52) U.S. Cl.
CPC .......... *G06F 13/4068* (2013.01); *G06F 13/10* (2013.01); *G02B 6/36* (2013.01); *G06F 13/14* (2013.01)

(58) Field of Classification Search
CPC ..... G06F 1/3209; G06F 3/0635; G06F 3/1285
USPC .................................. 710/38, 2, 36, 53, 110
See application file for complete search history.

(56) References Cited

U.S. PATENT DOCUMENTS

| | | |
|---|---|---|
| 5,095,417 A | 3/1992 | Hagiwara et al. |
| 5,357,517 A | 10/1994 | Takebe |
| 5,958,030 A | 9/1999 | Kwa |
| 6,639,806 B1 | 10/2003 | Chuang |
| 7,555,004 B2 | 6/2009 | Orlik et al. |
| 7,969,300 B2 | 6/2011 | Coronel et al. |

(Continued)

FOREIGN PATENT DOCUMENTS

| | | |
|---|---|---|
| JP | 2007527073 A | 9/2007 |
| JP | 4990755 B2 | 8/2012 |

(Continued)

OTHER PUBLICATIONS

International Search Report and Written Opinion dated Oct. 27, 2015 in connection with PCT/US2015/043607; 12 pages.

(Continued)

*Primary Examiner* — Ernest Unelus
*Assistant Examiner* — Getente A Yimer

(57) ABSTRACT

An apparatus includes a remote terminal unit (RTU) having one or more input/output (I/O) modules and a controller module. Each of the one or more I/O modules includes multiple I/O channels. The controller module includes at least one processing device configured to communicate with at least one industrial field device via the I/O channels of the I/O modules. The controller module includes a first connector, and a first of the one or more I/O modules includes a second connector. The first connector is configured to be physically connected to the second connector, and the first and second connectors are configured to transport data and power directly between the controller module and the first I/O module.

20 Claims, 9 Drawing Sheets

(56) References Cited

U.S. PATENT DOCUMENTS

| | | | |
|---|---|---|---|
| 8,072,098 B2* | 12/2011 | Elias | G01D 21/00 |
| | | | 307/140 |
| 8,239,046 B2 | 8/2012 | Koehler | |
| 8,315,263 B2 | 11/2012 | Enns et al. | |
| 8,352,049 B2 | 1/2013 | Hsiung et al. | |
| 8,392,626 B2 | 3/2013 | Wormmeester et al. | |
| 8,583,067 B2 | 11/2013 | Budampatl et al. | |
| 8,656,065 B1 | 2/2014 | Gerhart et al. | |
| 8,667,091 B2 | 3/2014 | Almadi et al. | |
| 8,868,907 B2 | 10/2014 | Graham et al. | |
| 9,021,255 B1 | 4/2015 | Aharoni et al. | |
| 9,379,972 B2 | 6/2016 | Enns | |
| 2002/0147503 A1 | 10/2002 | Osburn, III | |
| 2003/0151513 A1 | 8/2003 | Herrmann et al. | |
| 2004/0259533 A1 | 12/2004 | Nixon | |
| 2005/0174964 A1 | 8/2005 | Orlik et al. | |
| 2005/0216107 A1* | 9/2005 | O'Donnell | G06F 11/2294 |
| | | | 700/82 |
| 2005/0243867 A1 | 11/2005 | Petite | |
| 2005/0273205 A1* | 12/2005 | Nickerson | A01G 25/16 |
| | | | 700/284 |
| 2006/0087402 A1 | 4/2006 | Manning et al. | |
| 2006/0202728 A1 | 9/2006 | Wich | |
| 2006/0240818 A1 | 10/2006 | McCoy et al. | |
| 2007/0280144 A1 | 12/2007 | Hodson et al. | |
| 2008/0077336 A1 | 3/2008 | Fernandes | |
| 2008/0080395 A1 | 4/2008 | Law | |
| 2009/0201150 A1 | 8/2009 | Becker | |
| 2009/0224906 A1 | 9/2009 | Balgard | |
| 2009/0271558 A1 | 10/2009 | Wormmeester et al. | |
| 2009/0316628 A1 | 12/2009 | Enns et al. | |
| 2010/0079007 A1* | 4/2010 | Elias | G01D 21/00 |
| | | | 307/115 |
| 2010/0146167 A1* | 6/2010 | Rasche | G05B 19/054 |
| | | | 710/100 |
| 2010/0176933 A1 | 7/2010 | Trevino et al. | |
| 2011/0110291 A1 | 5/2011 | Ishii | |
| 2011/0246791 A1* | 10/2011 | Kambayashi | G06F 12/1408 |
| | | | 713/193 |
| 2011/0276607 A1 | 11/2011 | Surna et al. | |
| 2012/0041574 A1 | 2/2012 | Hsiung et al. | |
| 2012/0063330 A1 | 3/2012 | Mori | |
| 2012/0078869 A1 | 3/2012 | Bellville et al. | |
| 2012/0084400 A1 | 4/2012 | Almadi et al. | |
| 2012/0151588 A1 | 6/2012 | Wang et al. | |
| 2012/0230446 A1 | 9/2012 | Feng | |
| 2012/0236768 A1 | 9/2012 | Kolavennu et al. | |
| 2012/0290735 A1 | 11/2012 | Johnson et al. | |
| 2013/0110998 A1 | 5/2013 | Zrelli | |
| 2013/0151849 A1 | 6/2013 | Graham et al. | |
| 2013/0173840 A1* | 7/2013 | Calvin | G06F 13/00 |
| | | | 710/317 |
| 2013/0246801 A1* | 9/2013 | Takahashi | H04L 9/3297 |
| | | | 713/178 |
| 2013/0262064 A1 | 10/2013 | Mazzaro | |
| 2013/0307699 A1 | 11/2013 | Brekke et al. | |
| 2013/0344839 A1 | 12/2013 | Roach | |
| 2014/0119290 A1 | 5/2014 | Grewal | |
| 2014/0232555 A1 | 8/2014 | Aakvaag | |
| 2014/0321443 A1 | 10/2014 | Samudrala et al. | |
| 2015/0058480 A1 | 2/2015 | Allgaier | |
| 2015/0278144 A1 | 10/2015 | McLaughlin et al. | |
| 2015/0304193 A1 | 10/2015 | Ishii | |

FOREIGN PATENT DOCUMENTS

| | | |
|---|---|---|
| JP | 2013535730 A | 9/2013 |
| KR | 20100066815 A | 6/2010 |
| KR | 20120135142 A | 12/2012 |
| WO | 2005086110 A2 | 9/2005 |
| WO | WO 2014/197182 A1 | 12/2014 |
| WO | WO 2015/047744 A1 | 4/2015 |

OTHER PUBLICATIONS

U.S. Patent Application "Remote Terminal Unit (RTU) With Wireless Diversity and Related Method" U.S. Appl. No. 14/035,557, filed Sep. 24, 2013. 33 pages.

"25A Right Angle Signal/Power Combo"; SAMTEC Power Strip 25; 2008; 1 page.

"FCN-RTU Low Power Autonomous Controller Hardware"; STARDOM FCN-RTU; Yokogawa Electric Corporation; Dec. 2008; 13 pages.

"ControlWave Micro Process Automation Controller"; Instruction Manual; Emerson Process Management; Jun. 2013; 170 pages.

U.S. Patent Application "Remote Terminal Unit (RTU) With Universal Input/Output (UIO) and Related Method" U.S. Appl. No. 14/228,142, filed Mar. 27, 2014; 43 pages.

International Search Report dated Oct. 10, 2014 in connection with International Application No. PCT/US2014/038208; 3 pages.

Written Opinion of the Interriational Searching Authority dated Oct. 10, 2014 in connection with International Application No. PCT/US2014/038208; 5 pages.

International Search Report dated Dec. 11, 2014 in connection with International Application No. PCT/US2014/055307; 4 pages.

Written Opinion of the International Searching Authority dated Dec. 11, 2014 in connection with International Application No. PCT/US2014/055307, 7 pages.

European Search Report dated Sep. 22, 2014 in connection with European Patent Application No. 14164273.6; 3 pages.

Non-Final Office Action dated Dec. 22, 2014 in connection with U.S. Appl. No. 13/908,977.

Final Office Action dated Jun. 10, 2015 in connection with U.S. Appl. No. 13/908,977.

Office Action dated Jan. 29, 2016 in connection with U.S. Appl. No. 13/908,977.

Notification of Transmittal of the International Search Report and the Written Opinion of the International Searching Authority, or the Declaration dated Jun. 10, 2015 in connection with International Patent Application No. PCT/US2015/019671.

Office Action dated Aug. 2, 2016 in Connection with U.S. Appl. No. 14/228,142.

Office Action dated Jul. 14, 2016 in connection with U.S. Appl. No. 14/035,557.

Supplementary European Search Report dated Apr. 28, 2017 in connection with European Patent Application No. EP 14 84 8127.

David D. Brandt, "Solving the Issue of Interoperability among Devices and Systems", May 19, 2008, pp. 1-21, XP055091082.

* cited by examiner

US 9,875,207 B2

REMOTE TERMINAL UNIT (RTU) HARDWARE ARCHITECTURE

TECHNICAL FIELD

This disclosure relates generally to industrial process control and automation systems. More specifically, this disclosure relates to a remote terminal unit (RTU) hardware architecture.

BACKGROUND

A remote terminal unit (RTU) represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to a SCADA system. The SCADA system can execute control logic and alter the operations of actuators at the different sites via the RTUs. The RTUs themselves could also incorporate algorithms for data analytics.

In many conventional RTUs, the types of data inputs and data outputs available on the RTUs are fixed. While this typically enables conventional RTUs to be used in many different types of environments without modification, it can be a limiting factor in certain installations. For example, if more inputs or outputs of certain types are needed than are provided by a single RTU, multiple RTUs may be needed, which increases the size and cost of the installation.

SUMMARY

This disclosure provides a remote terminal unit (RTU) hardware architecture.

In a first embodiment, an apparatus includes an RTU having one or more input/output (I/O) modules and a controller module. Each of the one or more I/O modules includes multiple I/O channels. The controller module includes at least one processing device configured to communicate with at least one industrial field device via the I/O channels of the I/O modules. The controller module includes a first connector, and a first of the one or more I/O modules includes a second connector. The first connector is configured to be physically connected to the second connector, and the first and second connectors are configured to transport data and power directly between the controller module and the first I/O module.

In a second embodiment, an apparatus includes a controller module of an RTU. The controller module includes at least one processing device configured to communicate with at least one industrial field device via I/O channels of one or more I/O modules. The controller module further includes a first connector that is configured to be physically connected to a second connector of a first of the one or more I/O modules. The first connector is configured to transport data and power directly between the controller module and the first I/O module.

In a third embodiment, an apparatus includes an I/O module of an RTU. The I/O module includes multiple I/O channels configured to provide communication paths between a controller module of the RTU and at least one industrial field device. The I/O module further includes first and second connectors that are configured to be physically connected to other modules of the RTU. Each connector is configured to transport data and power directly between the I/O module and the other modules of the RTU.

In a fourth embodiment, an apparatus includes an expansion module of an RTU. The expansion module includes a connector configured to be physically connected to an I/O module of the RTU, where the I/O module includes multiple I/O channels configured to provide communication paths between a controller module of the RTU and at least one industrial field device. The expansion module also includes at least one port configured to be coupled to a second expansion module of the RTU, where the second expansion module is configured to be coupled to an additional I/O module. The connector is configured to transport data directly between the I/O module and the expansion module.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
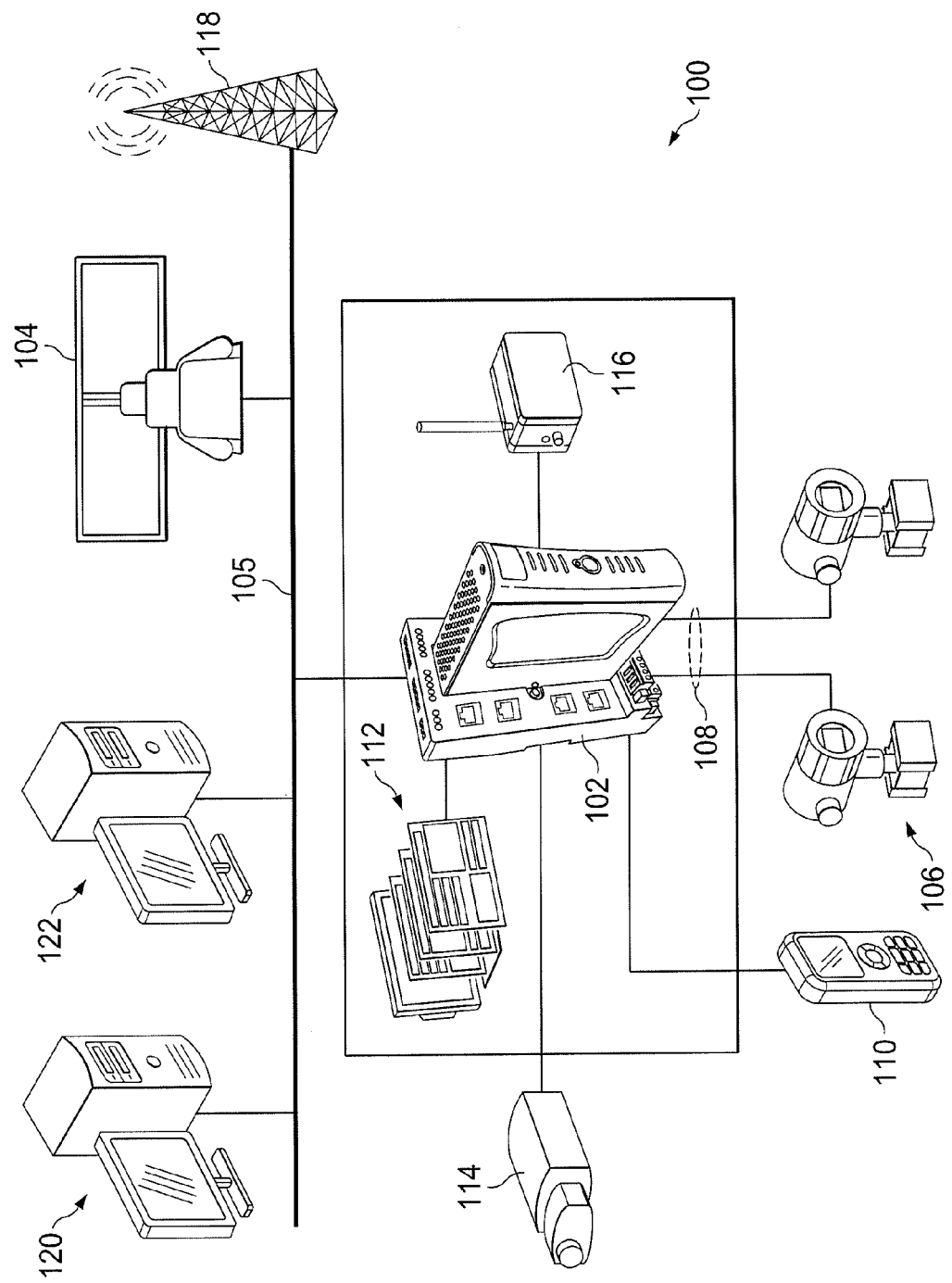
FIG. 1 illustrates an example industrial process control and automation system having a remote terminal unit (RTU) according to this disclosure.

FIG. 1 illustrates an example industrial process control and automation system 100 having an RTU 102 according to this disclosure. Note that the RTU 102 may also be referred to in the art as a "remote telemetry unit." Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 represent any suitable physical connections between the RTU 102 and the field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder 122. The FDM 120 can be used to configure and manage assets such as field devices (including the field devices 106), and the RTU builder 122 can be used to configure and manage RTUs (including the RTU 102).

As described in more detail below, the RTU 102 supports a hardware architecture that includes a controller module and one or more input/output (I/O) modules. The controller module supports the processing functionality of the RTU 102, and each I/O module supports a number of inputs and/or outputs used by the RTU 102. Moreover, the controller module and the I/O modules include connectors that allow the modules to be coupled directly to one another without requiring any additional wiring between the modules. Both data and power can be transported amongst the controller and I/O modules via these connectors.

Among other things, this approach helps to simplify the wiring for an RTU 102. In some conventional systems, a large amount of wiring is needed to couple a controller board and various I/O boards, and oftentimes a switch or other network device is needed to support communications between the boards. In accordance with this disclosure, communication channels and power can be provided through the direct connections between the controller and I/O modules. This can reduce or eliminate the need to couple separate cables to each module, as well as the need for switches or other networking devices coupling the modules. Also, this approach allows I/O modules to be easily added to an RTU 102 in order to obtain needed or desired I/O ports. Even if some I/O ports in the RTU 102 are fixed, additional I/O modules containing specified type(s) of I/O ports can be easily added to the RTU 102. In addition, this approach helps to reduce or avoid the need for costly additional components, such as backplanes. In some conventional systems, if additional I/O ports are needed and a backplane has no empty slot for an additional I/O board, an entirely new backplane is typically required. In accordance with this disclosure, a new I/O module can simply be connected to an existing RTU 102 when additional I/O ports are needed.

Although FIG. 1 illustrates one example of an industrial process control and automation system 100 having an RTU 102, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while shown as being used with wired field devices, the RTU 102 could be used with only wireless field devices or with both wired and wireless field devices. In addition, FIG. 1 illustrates one example operational environment where an RTU 102 with the described hardware architecture can be used. One or more RTUs using this hardware architecture could be used in any other suitable system.

Figure 2:
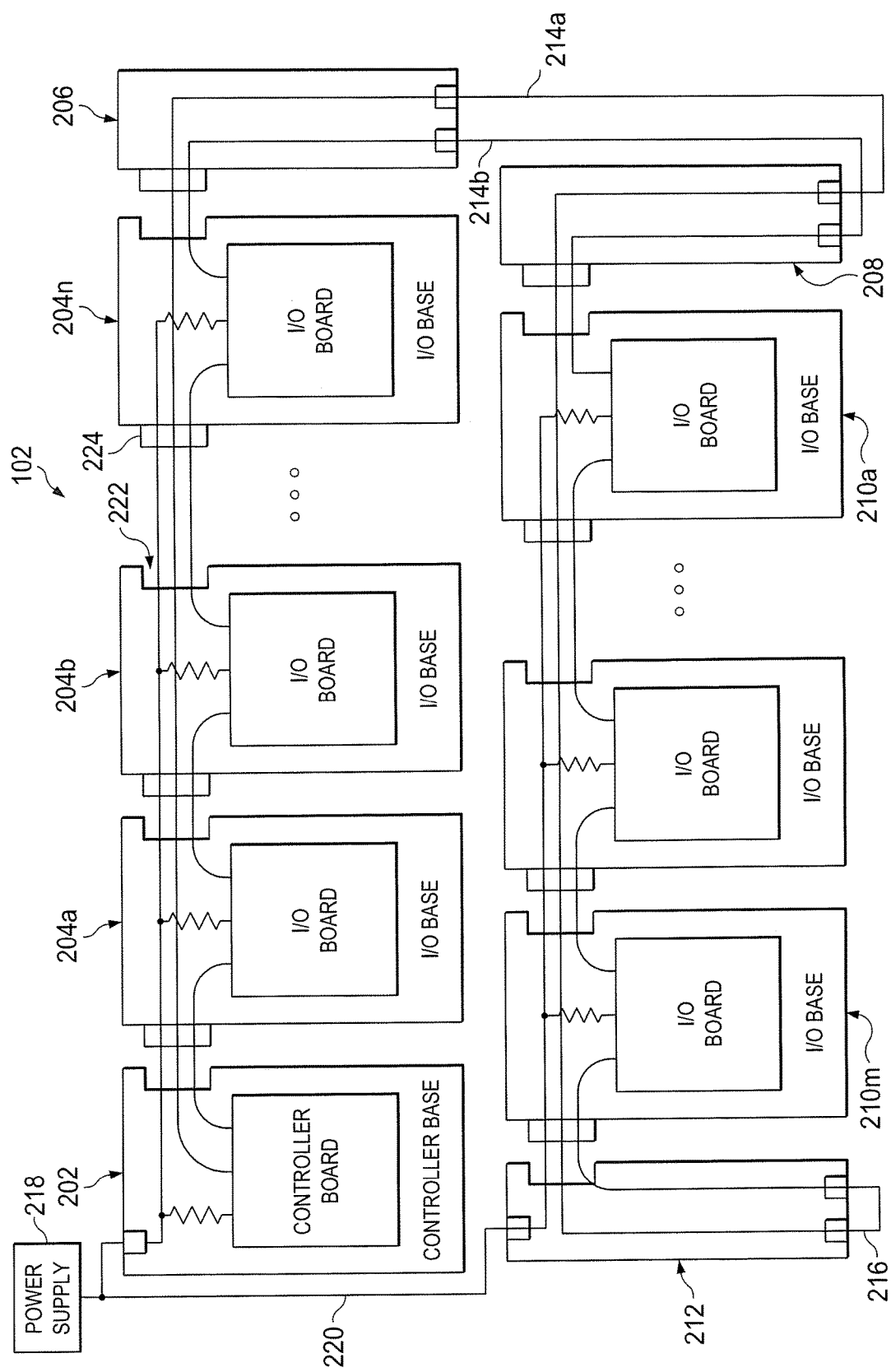
FIG. 2 illustrates an example RTU hardware architecture according to this disclosure.

FIG. 2 illustrates an example RTU hardware architecture according to this disclosure. For ease of explanation, the RTU 102 is described as being used in the system 100 of FIG. 1. However, the RTU 102 could be used in any other suitable system.

As shown in FIG. 2, the RTU 102 includes a controller module 202, a first set of I/O modules 204a-204n, and an expansion module 206. The controller module 202 represents the module that executes control logic and other processing functions of the RTU 102. For example, the controller module 202 could execute control logic that analyzes sensor data and generates control signals for actuators. The controller module 202 could also execute functions that control the overall operation of the RTU 102, such as functions supporting communications with external devices or systems. The controller module 202 includes any suitable structure for controlling one or more operations of an RTU. In some embodiments, the controller module 202 includes at least one processing device that executes a LINUX or other operating system.

The I/O modules 204a-204n represent I/O boards that are coupled to the controller module 202. Data can be transported between the controller module 202 and external devices or systems (such as the field devices 106) via the I/O channels of the I/O modules 204a-204n. Each I/O module 204a-204n includes circuitry supporting the use of one or more I/O channels. Example types of I/O channels include analog input (AI) channels, AI channels supporting digital communications, analog output (AO) channels, AO channels supporting digital communications, digital input (DI) channels, digital output (DO) channels, and pulse accumulator input (PI) channels.

In some embodiments, the I/O channels of each I/O module 204a-204n are fixed. That is, each I/O module 204a-204n includes a specified number of inputs or outputs of one or more pre-defined types. In these embodiments, an I/O module 204a-204n could include any number of one or more fixed types of inputs or outputs. An I/O module 204a-204n could include multiple instances of a single fixed type of input or output, or an I/O module 204a-204n could include a combination of different fixed types of inputs or outputs. However, any other suitable I/O module supporting any suitable I/O channels could be used.

The RTU 102 can include any number of I/O modules 204a-204n. In some embodiments, a specified number of I/O modules 204a-204n could fit within a given space, such as on one shelf of a cabinet. If additional I/O modules are needed, the expansion module 206 can be coupled to an expansion module 208, which itself can be coupled to a second set of I/O modules 210a-210m. The I/O modules 210a-210m could have the same or similar structure as the I/O modules 204a-204n, and any number of I/O modules 210a-210m could be used in the second set. An expansion module 212 can be used to couple to a third set of I/O modules, and additional I/O modules can be added in a similar manner. Each expansion module 206, 208, 212 includes any suitable structure facilitating the addition of one or more I/O modules to an RTU.

In this example, two electrical paths 214a-214b are formed through the RTU 102, and the electrical paths 214a-214b are optionally joined at a loop 216. The electrical paths 214a-214b denote communication paths between the controller and I/O modules in the RTU 102. The electrical paths 214a-214b could be formed in any suitable manner, such as by using Ethernet connections and electrical paths through the I/O modules and expansion modules. The loop 216 can be used to indicate that no additional I/O modules are presently connected to the RTU 102 and to form a ring type of network between the controller and I/O modules in the RTU 102. Note, however, that the loop 216 could also be placed on the expansion module 206 to indicate that the I/O modules 210a-210m are not currently connected to the RTU 102. The use of two electrical paths 214a-214b here helps to provide redundant communication paths. For instance, the electrical paths 214a-214b and the loop 216 can form a ring, and communications can occur in either direction along the ring.

A power supply 218 provides operating power to other components of the RTU 102. The power supply 218 includes any suitable structure(s) configured to provide operating power to an RTU. For example, the power supply 218 could include one or more batteries, solar panels, fuel cells, or other source(s) of power. In particular embodiments, the power supply 218 includes one or more solar panels, a battery backup, and a voltage regulator that charges the battery backup and provides power from the solar panels or battery backup to the other components of the RTU. Power is provided to the various modules here using power connections 220.

In some embodiments, the controller module 202 receives runtime and diagnostic data from one or more field devices 106 via one or more I/O modules, such as the I/O modules 204a-204n, 210a-210m. The controller module 202 can provide the runtime data and historical data (which could be stored in the controller module 202 or other location) to the control system 104. The controller module 202 can also provide the diagnostic data to the FDM 120. In response to the execution of control logic at the RTU 102 or the control system 104, the controller module 202 can provide control signals for one or more actuators or other field devices via one or more I/O modules, such as the I/O modules 204a-204n, 210a-210m.

In particular embodiments, the controller module 202 executes a LINUX operating system, supports communication with the control system 104 using a MODBUS or DNP3 protocol, and communicates with the FDM 120 using a HART OVER IP (HART-IP) protocol. Also, the International Electrotechnical Commission (IEC) 61131 standard can be supported by the controller module 202 for programming the RTU 102.

As shown in FIG. 2, each controller module and I/O module includes a connector 222, and each expansion module and I/O module includes a connector 224. The connectors 222-224 are used to secure adjacent modules of the RTU 102 together. Moreover, the connectors 222-224 are able to form direct electrical connections between adjacent modules of the RTU 102. As a result, the first I/O module 204a can be physically connected to the controller module 202, each remaining I/O module 204b-204n can be physically connected to the preceding I/O module, and the expansion module 206 can be physically connected to the I/O module 204n. Similar physical connections can be made with the expansion module 208, the I/O modules 210a-210m, and the expansion module 212.

Data and power connections between the adjacent modules are formed through the connectors 222-224. As shown here, power can be supplied to an entire string of I/O modules (and optionally the controller module) through a single power connection 220 to the power supply 218. Moreover, no cables may be needed to transport data between adjacent modules in each string. In some embodiments, cables for data could be used only when coupling expansion modules (such as expansion modules 206-208) and when forming the loop 216 (if desired). As a result, wiring within the RTU 102 can be greatly simplified. Further, faster data connections can be used between modules within the RTU 102, such as Ethernet connections. These connections are faster than conventional connections used in RTUs, such as RS232 or RS485 serial connections. In addition, a large number of I/O modules can be coupled to the same controller module 202 in this architecture, which helps to avoid the use of expensive backplanes and allows any desired combination of inputs and outputs to be supported by the RTU 102.

Each connector 222-224 includes any suitable structure for connecting multiple modules of an RTU and for transporting power and data between those modules. In this example, the connectors 222 are shown as female connectors, and the connectors 224 are shown as male connectors. These connectors could be reversed if desired. Moreover, different types of connectors could also be used to connect multiple modules of an RTU and transport power and data between those modules.

Although FIG. 2 illustrates one example of an RTU hardware architecture, various changes may be made to FIG. 2. For example, the hardware architecture could include any number of I/O modules, including a single I/O module, a single string of I/O modules, or multiple strings of equal or unequal numbers of I/O modules. Also, the final expansion module and the loop 216 in the RTU 102 could be omitted if a ring network is not desired or required in a particular installation. Further, while shown as containing two electrical paths 214a-214b through the RTU 102 and using two cables to connect expansion modules, a single electrical path through the RTU 102 and a single cable to connect expansion modules could be used.

Figure 3B:
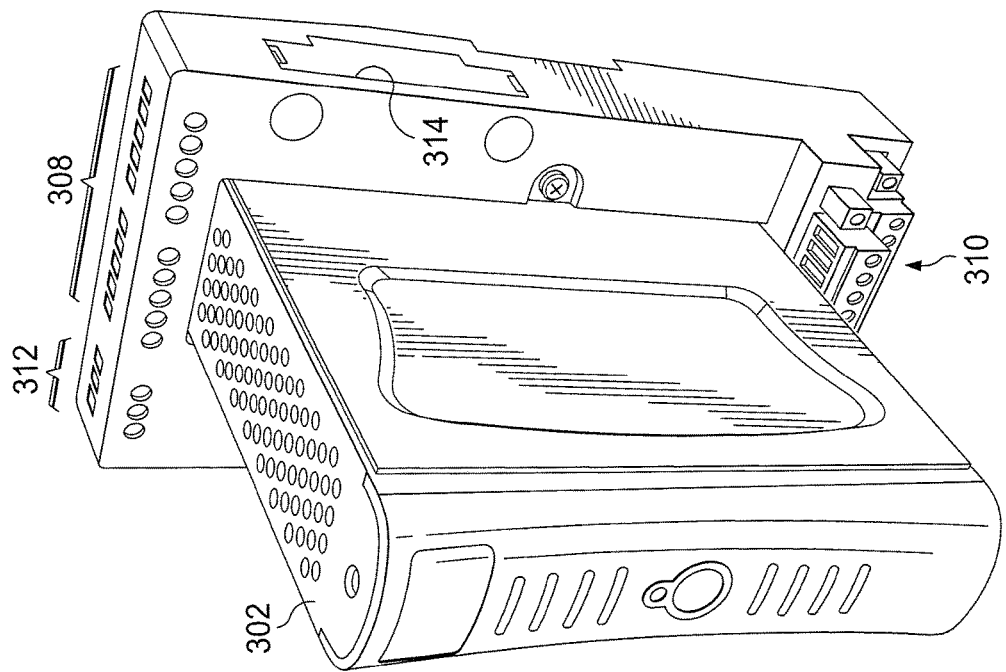
FIGS. 3A through 8 illustrate additional details of an example RTU according to this disclosure.
Figure 3A:
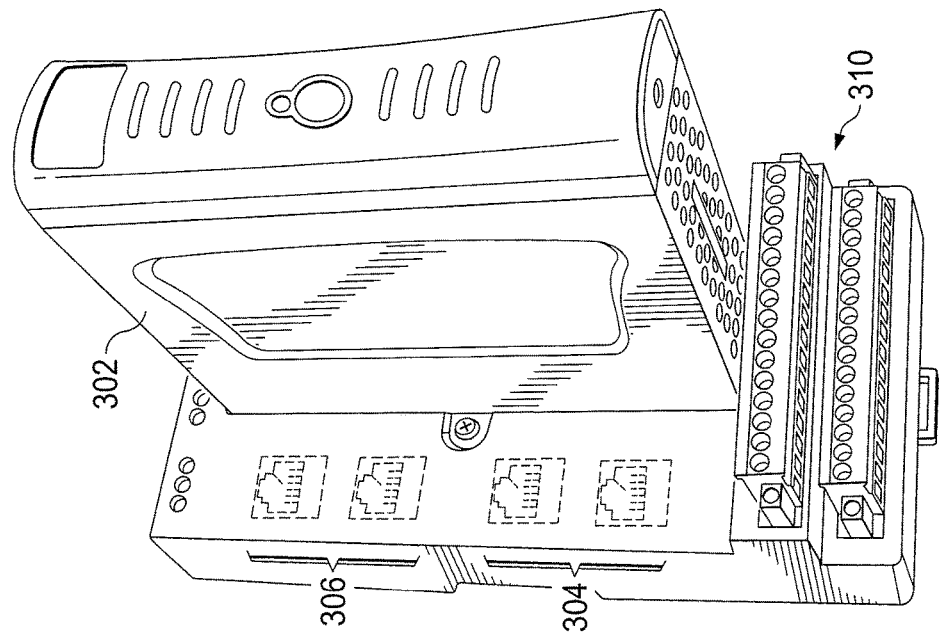

FIGS. 3A through 8 illustrate additional details of an example RTU 102 according to this disclosure. FIGS. 3A through 3C illustrate a particular implementation of the controller module 202 and related details. A housing 302 is used to encase and protect other components of the RTU 102. The housing 302 also provides access to various other components of the RTU 102, such as one or more ports or terminals. The housing 302 can have any suitable size, shape, and dimensions and be formed from any suitable material(s) (such as metal or ruggedized plastic).

The RTU 102 also includes two uplink ports 304, two RS232 ports 306, and two RS485 ports 308. The ports 304 can be used to couple the RTU 102 to higher-level devices, such as the control system 104, FDM 120, or RTU builder 122 via the network 105. The ports 304 could represent any suitable structures for coupling to one or more communication links, such as Ethernet ports. The RS232 ports 306 and the RS485 ports 308 could be used to couple the RTU 102 to one or more field devices or other devices that use the RS232 or RS485 serial protocol.

Various I/O terminals 310 are also used to couple the RTU 102 to one or more field devices. The I/O terminals 310 here could be used in conjunction with I/O channels that are built into the controller module 202. These I/O terminals 310 provide a communication path between the controller module 202 and the field device(s) coupled to the I/O terminals 310. The I/O terminals 310 can be coupled to various types of field devices, such as analog and digital field devices, depending on the configuration of the I/O channels. The I/O terminals 310 include any suitable structures for coupling to different communication paths, such as screw terminals.

A power terminal 312 can be used to couple the RTU 102 to a power supply, such as the power supply 218. A slot 314 provides access to the connector 222 of the controller module 202, which can be coupled to an I/O module (such as I/O module 204a) as shown in FIG. 2.

Figure 3C:
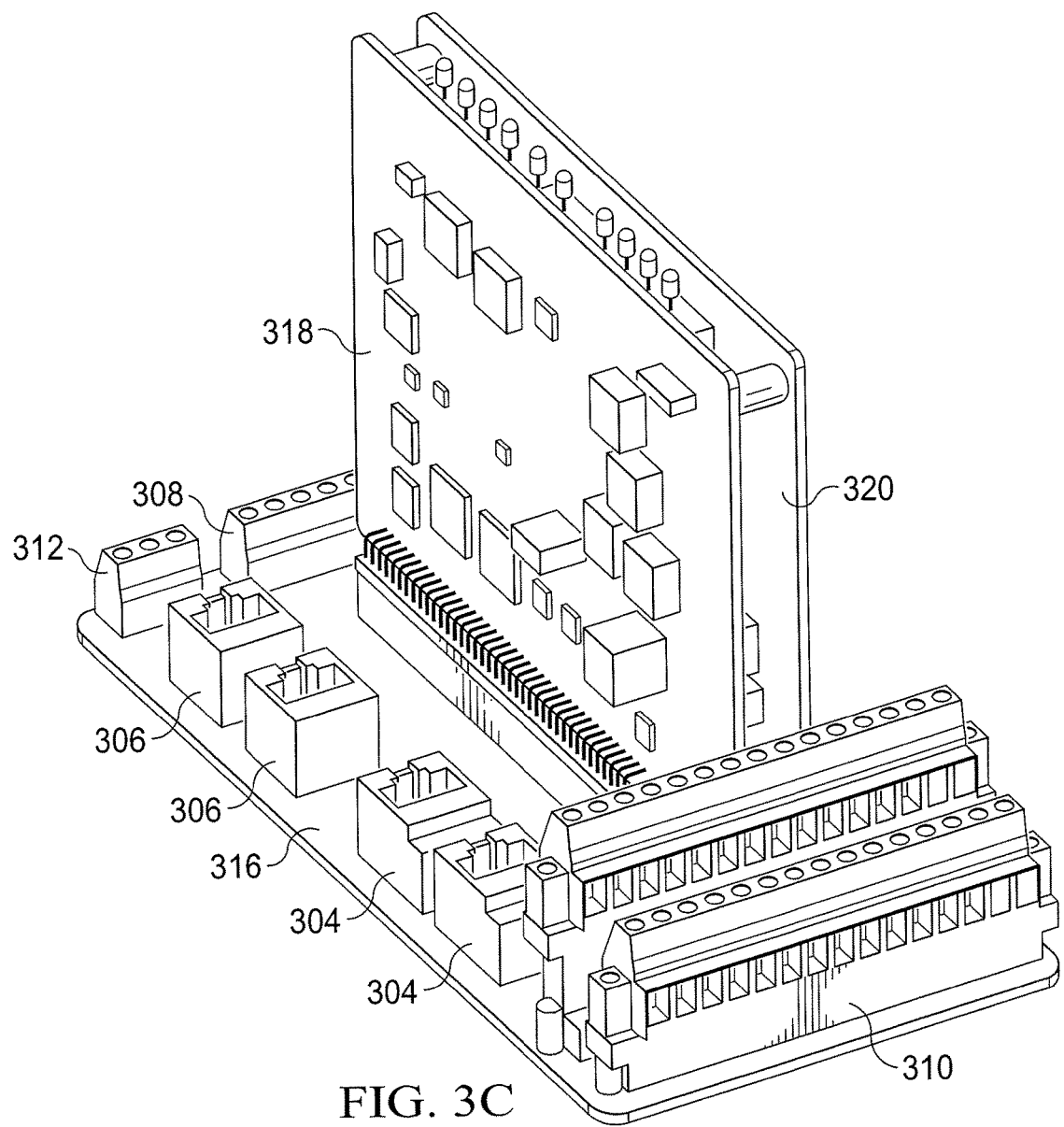

Note that the numbers and types of ports and terminals shown in FIGS. 3A through 3C are for illustration only. The RTU 102 could include any suitable type(s) and number(s) of interfaces as needed or desired.

As shown in FIG. 3C, the RTU 102 further includes three printed circuit boards (PCBs). A first circuit board 316 represents the substrate on which the ports 304-308, I/O terminals 310, and other input/output components can be located. The circuit board 316 represents any suitable substrate, such as an Input Output Termination Assembly (IOTA) board. For this reason, the circuit board 316 may be referred to below as the IOTA board 316.

A second circuit board 318 and a third circuit board 320 are coupled to the IOTA circuit board 316. The second circuit board 318 represents a board having at least one processing device that executes an operating system for the RTU 102. For this reason, the circuit board 318 may be referred to below as the kernel board 318. The circuit board 318 could also include at least one memory, a power supply or power converter, and one or more communication interfaces. As a particular example, the circuit board 318 could include a field programmable gate array (FPGA).

The third circuit board 320 represents an application board that contains I/O modules. The I/O modules of the circuit board 320 are coupled to the I/O terminals 310 and support a specified number of I/O channels for the controller module 202. The I/O channels supported by the circuit board 320 could include any suitable I/O channels, and these channels allow the controller module 202 to be used immediately without the need for any additional I/O modules to be coupled to the controller module 202 through the slot 314.

Figure 4:
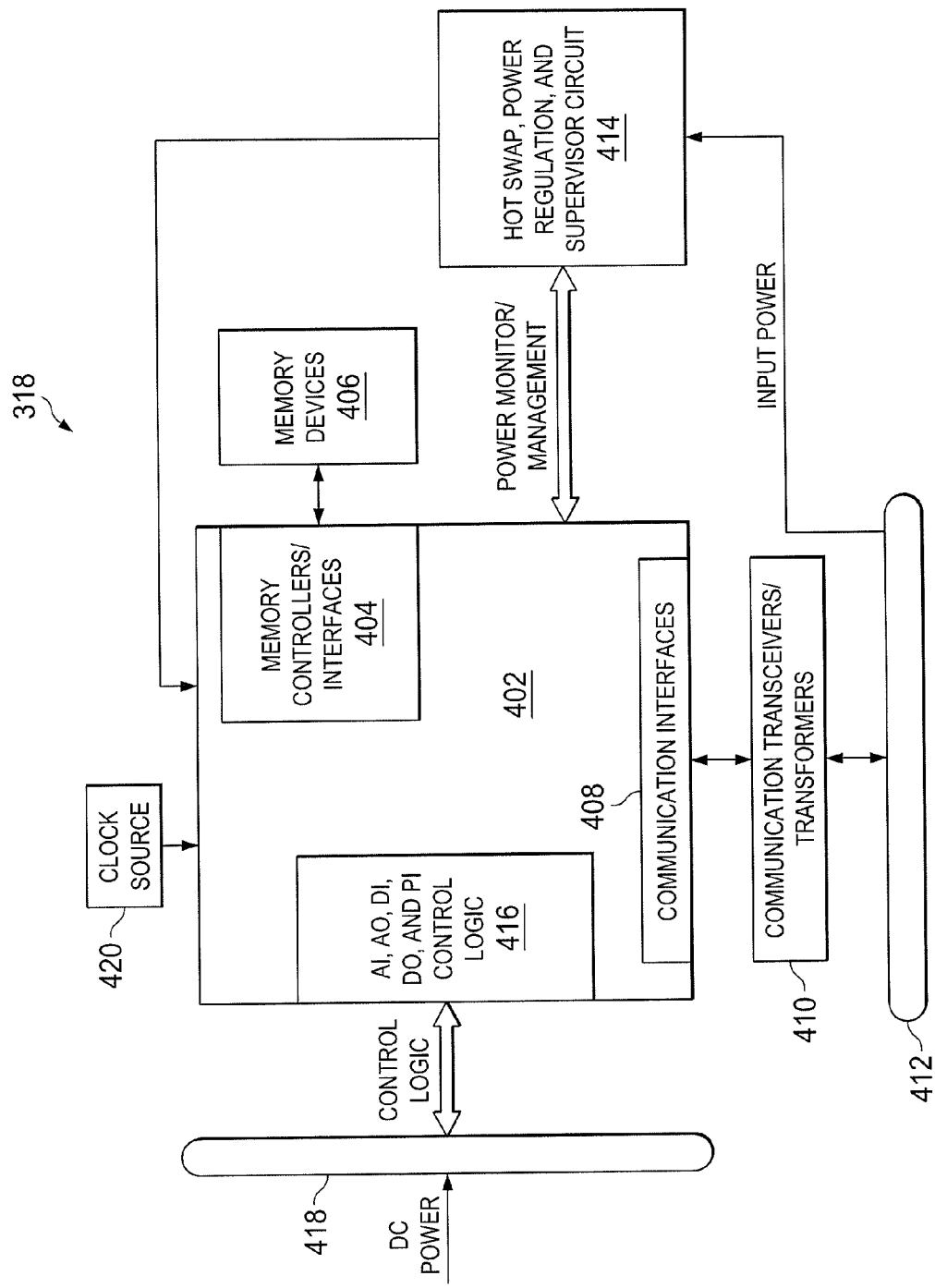

FIG. 4 illustrates an example of the kernel board 318 in the RTU 102. As shown in FIG. 4, the kernel board 318 includes at least one processing device 402. The processing device(s) 402 can execute an operating system and otherwise perform various operations to support the functions of the controller module 202. Each processing device 402 includes any suitable processing or computing device, such as a microprocessor, microcontroller, digital signal processor, FPGA, ASIC, or discrete logic devices. In particular embodiments, the processing device 402 represents a XILINX ZYNQ-7000 Extensible Processing Platform (EPP).

The processing device(s) 402 can include or otherwise support one or more memory interfaces/controllers 404, which could be used to support data transfers to and from one or more memory devices 406. Any suitable memory interfaces/controllers 404 could be used in the RTU 102, such as one or more serial peripheral interfaces (SPIs), double data rate (DDR) interfaces, secure digital input output (SDIO) interfaces, or inter-integrated circuit (I²C) controllers. Similarly, any suitable memory devices 406 could be used in the RTU 102, such as one or more Flash memories; DDR3, magnetoresistive, or other random access memories; secure digital (SD) cards; or electrically erasable programmable read only memories or other read only memories. At least one of the memory devices 406 could be used to store data during power losses by the RTU 102 so that the data can be retrieved when power is restored to the RTU 102.

The processing device(s) 402 can also include or otherwise support one or more communication interfaces 408, which could be used to support data transfers to and from one or more communication transceivers/transformers 410. Any suitable communication interfaces 408 could be used in the RTU 102, such as one or more universal asynchronous receiver/transmitter (UART) interfaces, or reduced media independent interfaces (RMIIs). Also, any suitable communication transceivers/transformers 410 could be used in the RTU 102, such as one or more Ethernet switches, Ethernet transceivers, RS232 transceivers, or RS485 transceivers. A connector 412 couples the kernel board 318 to the IOTA board 316. Among other things, the communication transceivers/transformers 410 can communicate with the IOTA board 316 via the connector 412. The connector 412 includes any suitable structure configured to transport signals between circuit boards.

Circuitry 414 receives input power from the IOTA board 316 via the connector 412. The circuitry 414 provides various functions, such as hot swap, power regulation, and supervisory functions. As a particular example, the circuitry 414 could receive a 24 VDC signal as input power and convert the input power into one or more other forms. For instance, the circuitry 414 could convert a 24 VDC input power into 1.8 VDC, 3.3 VDC, and 5 VDC signals. The circuitry 414 can also exchange power monitoring and management information with the processing device 402. This allows, for example, the processing device 402 to perform or trigger functions during over-voltage or under-voltage conditions.

The processing device(s) 402 could further include or otherwise support control logic 416 for controlling the overall operations of the RTU 102 and interactions via the I/O channels. The control logic 416 could be implemented in any suitable manner, such as using hardware only or a combination of hardware and software/firmware instructions.

A connector 418 couples the kernel board 318 to the application board 320, which allows the processing device(s) 402 to provide data to or receive data from the application board 320. The connector 418 also allows the circuitry 414 to provide DC power to the application board 320. The connector 418 includes any suitable structure configured to transport signals between circuit boards.

A clock source 420 is used to provide one or more clock signals to the processing device(s) 402. The clock source 420 includes any suitable source of one or more clock signals, such as a local oscillator.

Figure 5:
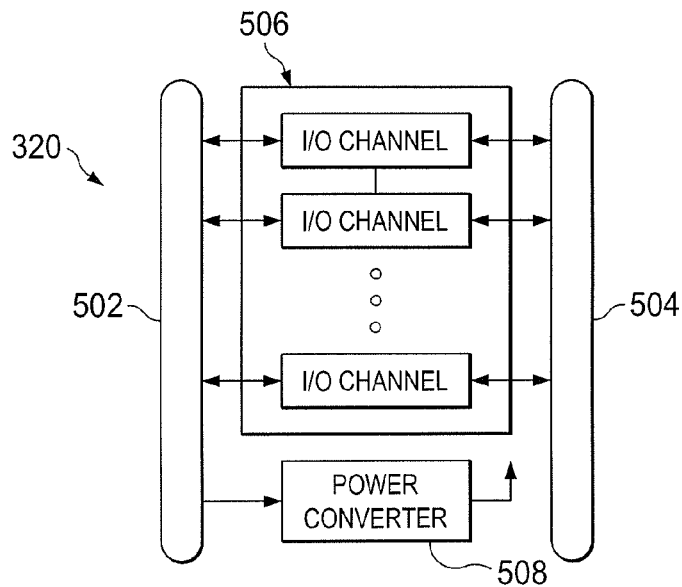

FIG. 5 illustrates an example of the application board 320 in the RTU 102. The application board 320 generally includes data acquisition and output control circuits. As shown in FIG. 5, the application board 320 includes a connector 502 that couples the application board 320 to the kernel board 318. The application board 320 also includes a connector 504 that couples the application board 320 to the IOTA board 316. Each connector 502-504 includes any suitable structure configured to transport signals between circuit boards.

The application board 320 further includes I/O circuitry 506 supporting multiple I/O channels. The I/O channels support communications between the RTU 102 and external devices or systems. For example, each I/O channel can be configured to operate as an AI (with or without digital communication), AO (with or without digital communication), DI, DO, or PI channel.

In this example, there is no power regulator in the application board 320, and power is received from the kernel board 318 via the connector 502 (although this need not be the case). A power converter 508 can be used to convert the power received from the kernel board 318. For example, the power converter 508 could include a boost converter that boosts a voltage received from the kernel board 318, such as from 5 VDC to 6 VDC.

Figure 6:
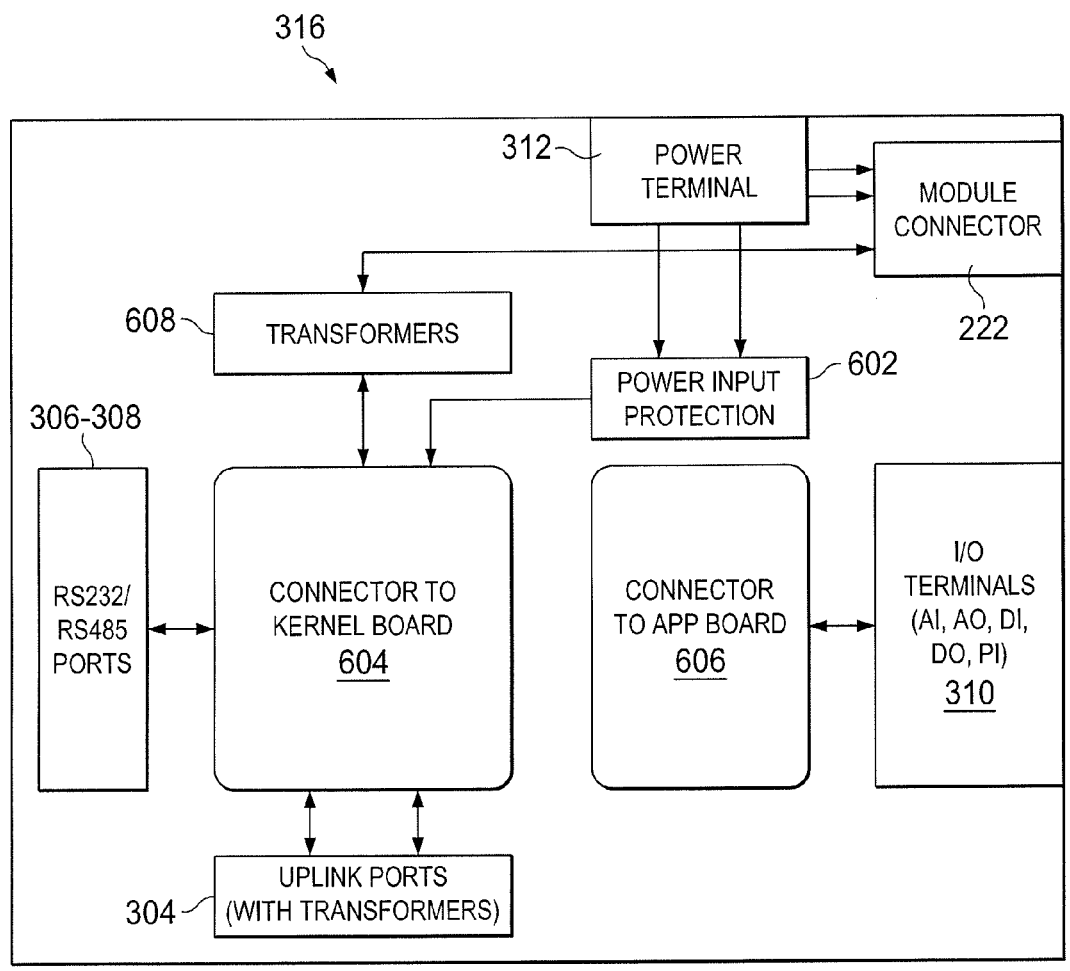

FIG. 6 illustrates an example IOTA board 316 in the RTU 102. As shown in FIG. 6, the IOTA board 316 includes the uplink ports 304, the RS232 and RS485 ports 306-308, the I/O terminals 310, and the power terminal 312 described above.

A power input protection circuit 602 receives power from the power terminal 312 and provides input power to the kernel board 318 via a connector 604. For example, the protection circuit 602 could provide over-voltage protection for the RTU 102. The protection circuit 602 includes any suitable structure(s) providing power protection. A connector 606 allows the application board 320 to be coupled to the I/O terminals 310. Each connector 604-606 includes any suitable structure configured to transport signals between circuit boards.

The module connector 222 allows the IOTA board 316 of the RTU 102 to be connected to an additional I/O module (such as the I/O module 204a). Transformers 608 are used to couple the module connector 222 to the kernel board 318 via the connector 604. This allows the kernel board 318 to interact with additional I/O modules, such as I/O modules 204a-204n, 210a-210m coupled to the module connector 222. The transformers 608 include any suitable structures for helping to isolate components of the RTU 102. In some embodiments where Ethernet connections are used to form the electrical paths 214a-214b, the transformers 608 could represent Ethernet transformers.

Figure 7:
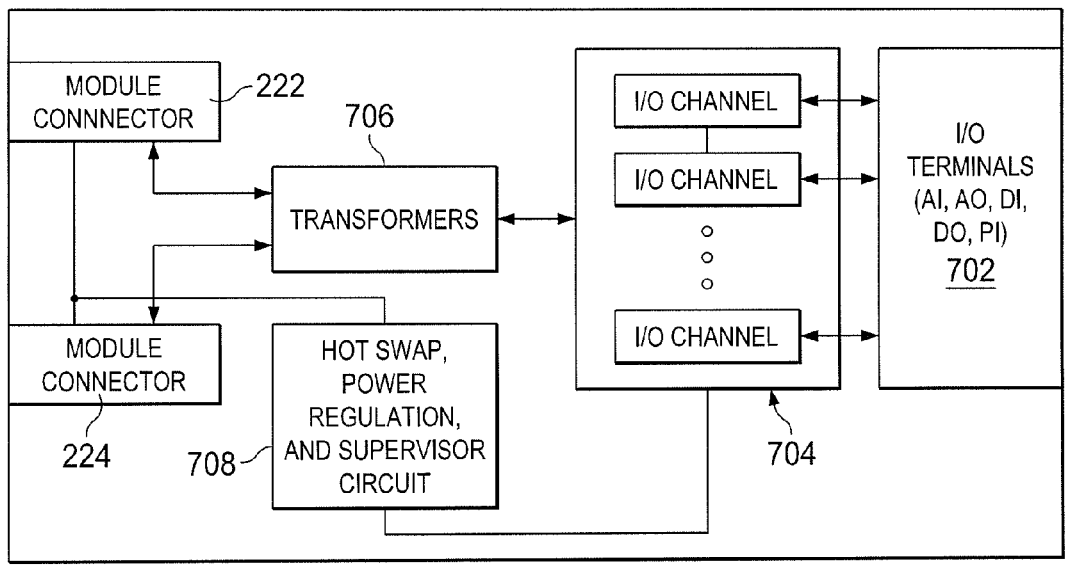

FIG. 7 illustrates an example I/O module 204a-204n, 210a-210m for use in an RTU 102. As shown in FIG. 7, the I/O module includes I/O terminals 702 and I/O circuitry 704. The I/O terminals 702 are used to couple the I/O module to one or more field devices in order to provide a communication path between the I/O module and the field device(s). The I/O terminals 702 include any suitable structures for coupling to different communication paths, such as screw terminals. The I/O circuitry 704 supports multiple I/O channels, which are used to support communications with field devices via the I/O terminals 702.

The connectors 222-224 here allow the I/O module of the RTU 102 to be physically connected to a controller module, one or more other I/O modules, and/or an expansion module. As noted above, the connectors 222-224 also couple the I/O module to the electrical paths 214a-214b and a power connection 220. Data is communicated by the I/O circuitry 704 over the electrical paths 214a-214b via transformers 706, such as Ethernet transformers. Power is received from the power connection 220 via power circuit 708, which could support functions such as hot swap, power regulation, and supervisory functions.

As can be seen here, the I/O module can be easily coupled to one or more adjacent modules using one or both connectors 222-224. Data and power are transported through the connector(s) 222-224, helping to reduce the wiring used in the RTU 102. Moreover, an I/O module with the desired inputs and/or outputs can be easily selected and coupled to an RTU 102, allowing the RTU 102 to be expanded as needed.

Figure 8:
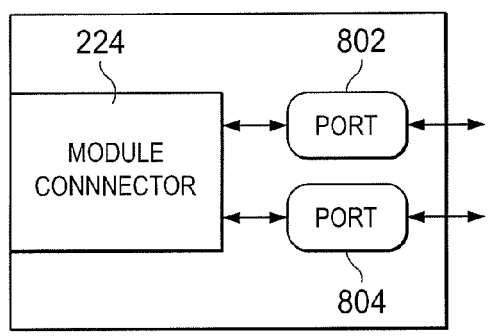

FIG. 8 illustrates an example expansion module 206, 208, 212 for use in an RTU 102. As shown in FIG. 8, the expansion module includes one or more ports 802-804, which could be coupled to a cable forming the loop 216 or to one or more cables coupling the expansion module to another expansion module. Each port 802-804 could represent an RJ45 port or other suitable structure. Communications with an adjacent I/O module occur via the connector 224, which is coupled to the ports 802-804. Although not shown, power if needed could be received via the connector 224 and used within the expansion module.

As noted above, the use of an expansion module is optional in an RTU. For example, one or more expansion modules may be used if a loop 216 is to be formed in the RTU 102 or if multiple strings of I/O modules are needed in the RTU 102. If all I/O modules can reside within a single string and no loop 216 is needed, the RTU 102 need not include any expansion modules. If I/O modules reside within multiple strings but no loop 216 is used, the RTU 102 may only include expansion modules between the strings.

Although FIGS. 3A through 8 illustrate additional details of one example RTU 102, various changes may be made to FIGS. 3A through 8. For example, the number(s) and type(s) of ports and interfaces shown in FIGS. 3A through 8 are for illustration only. Also, the functional divisions of the RTU 102 shown in FIGS. 3A through 8 are for illustration only. Various components in the RTU 102 could be omitted, combined, or further subdivided and additional components could be added according to particular needs.

Figure 9A:
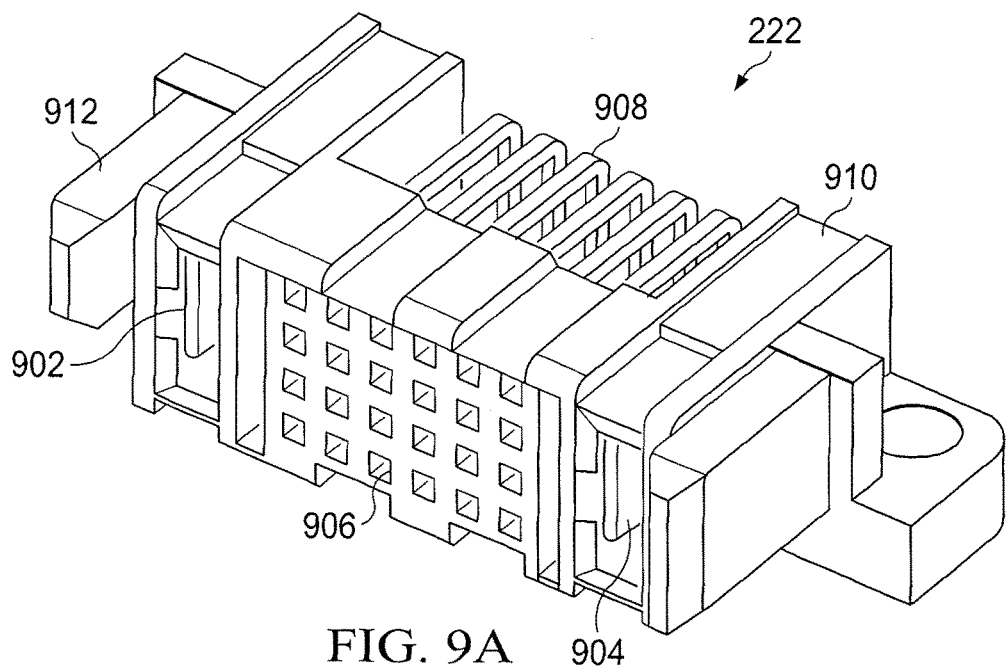
FIGS. 9A and 9B illustrate example connectors for coupling modules of an RTU according to this disclosure.
Figure 9B:
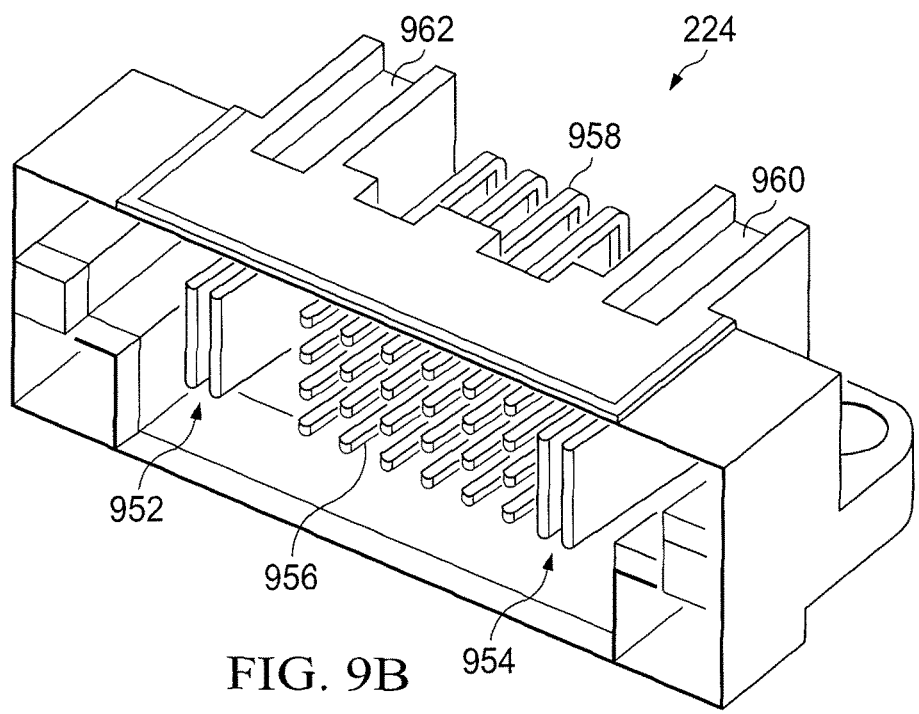

FIGS. 9A and 9B illustrate example connectors 222-224 for coupling modules of an RTU 102 according to this disclosure. As shown in FIG. 9A, the connector 222 includes two power conductors 902-904, which are used to transfer power between modules through the connector 222. Each power conductor 902-904 here is shown as being a single conductor that is generally flat and that extends vertically within the connector 222, although each power conductor 902-904 could have any other suitable form factor.

The connector 222 also includes a number of openings 906 that are configured to receive pins or other conductors from the connector 224. The openings 906 allow the conductors from the other connector 224 to form electrical connections with conductors 908, which can be coupled to other components within a controller, I/O, or expansion module. The openings 906 here are arranged in a four by six grid, although any number of openings 906 in any suitable arrangement could be used.

A connector block 910 can be used to hold the power conductors 902-904 and the conductors 908, and the openings 906 can be formed in the connector block 910. The connector block 910 can also be coupled to a cable, electrical traces, or other structure that forms electrical connections through the connector block 910. The connector block 910 could be formed from any suitable material(s), such as metal or plastic.

As shown in FIG. 9B, the connector 224 includes two power conductors 952-954, which are used to transfer power between modules through the connector 224. Each power conductor 952-954 here is shown as including a pair of conductors that are generally flat and that extend vertically within the connector 222, although each power conductor 952-954 could have any other suitable form factor. In this configuration, the dual-conductor structure of each power conductor 952-954 mates with the single-conductor structure of a power conductor 902-904.

The connector 224 also includes a number of pins 956 that form conductors configured to mate with the openings 906 in the connector 902. The pins 956 here are arranged in a four by six grid, although any number of pins 956 in any suitable arrangement could be used. The pins 956 are in electrical connection with various conductors 958, which can be coupled to other components within a controller, I/O, or expansion module.

A connector block 960 can be used to hold the power conductors 952-954, pins 956, and conductors 958. The connector block 960 can also be coupled to a cable, electrical traces, or other structure that forms electrical connections through the connector block 960. The connector block 960 could be formed from any suitable material(s), such as metal or plastic.

As can be seen here, physically connecting adjacent controller, I/O, or expansion modules using the connectors 222-224 can reduce or eliminate the need to wire each module individually for power and data. This can greatly simplify installation of the RTU 102.

The connectors 222-224 can also be used to help secure two adjacent modules of the RTU 102 together. For example, the connector 222 here includes two projections 912, which can be inserted into corresponding slots 962 of the connector 224. Friction can be used to hold the projections 912 in the slots 962, although other mechanisms could also be used to help keep the projections 912 in the slots 962.

Although FIGS. 9A and 9B illustrate examples of connectors 222-224 for coupling modules of an RTU 102, various changes may be made to FIGS. 9A and 9B. For example, these connectors 222-224 are for illustration only. Any other suitable connectors could be used to couple adjacent modules of an RTU and to transport data and power between modules.

Figure 10:
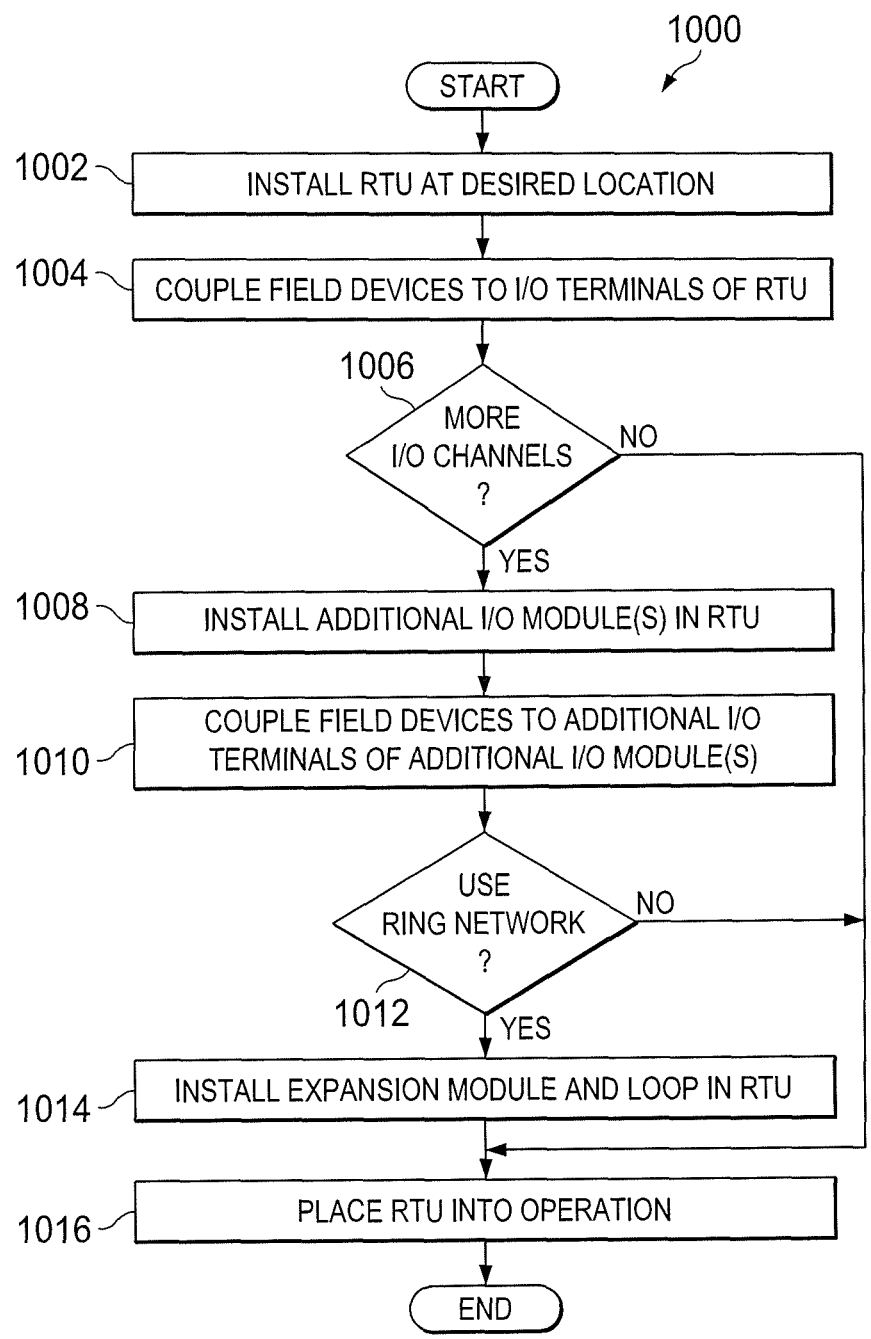
FIG. 10 illustrates an example method for using an RTU according to this disclosure.

FIG. 10 illustrates an example method 1000 for using an RTU according to this disclosure. For ease of explanation, the method 1000 is described as involving the use of the RTU 102 in the system 100. However, the method 1000 could be used with any suitable RTU and in any suitable system.

As shown in FIG. 10, an RTU is installed at a desired location at step 1002. This could include, for example, personnel installing the controller module 202 in a cabinet or other structure in the field. One or more field devices are coupled to one or more I/O terminals of the RTU at step 1004. This could include, for example, the personnel coupling electrical lines from the field devices 106 to the I/O terminals 310 of the controller module 202.

A determination is made whether more I/O channels are needed at step 1006. This could include, for example, the personnel determining whether the controller module 202 contains enough built-in I/O channels or if more I/O channels are needed. If more I/O channels are needed, one or more additional I/O modules are installed at step 1008. This could include, for example, the personnel coupling one or more I/O modules to the controller module 202. This could also include the personnel using one or more expansion modules to couple multiple strings of I/O modules to the controller module 202. The connectors 222-224 are used here to form data and power connections between the various modules being installed. One or more additional field devices are coupled to the additional I/O module(s) at step 1010.

A determination is made whether a ring network is needed or desired in the RTU at step 1012. This could include, for example, the personnel determining if redundant communication paths are needed or desired in the RTU 102. If so, an expansion module and a loop are installed in the RTU at step 1014. This could include, for example, the personnel installing an expansion module coupled to the last I/O module in the RTU 102. This could also include the personnel coupling a cable to the ports 802-804 of the expansion module to form the loop 216.

The RTU is placed into operation at step 1016. This could include, for example, the RTU 102 transmitting or receiving data via the various I/O channels. During this time, power is provided between modules using the connectors 222-224, such as via the power conductors 902-904, 952-954 of the connectors 222-224. Also, data is exchanged between the modules using the connectors 222-224, such as via the pins 956 and conductors 908, 958 of the connectors 222-224.

Although FIG. 10 illustrates one example of a method 800 for using an RTU, various changes may be made to FIG. 10. For example, while shown as a series of steps, various steps in FIG. 10 could overlap, occur in parallel, occur in a different order, or occur multiple times. Also, the controller module 202 may lack built-in I/O channels, in which case steps 1004-1006 could be omitted.

It may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a remote terminal unit (RTU) comprising:
   a plurality of input/output (I/O) modules connected in series, each comprising multiple I/O channels, wherein a first I/O module of the plurality of I/O modules comprises a first connector and a third connector, a second I/O module of the plurality of I/O modules comprises a fourth connector, the third connector is configured to be physically connected to the fourth connector, and the third and fourth connectors are configured to transport data and power directly between the first I/O module and the second I/O module; and
a controller module comprising:
at least one processing device configured to communicate with at least one industrial field device via the I/O channels of the I/O modules, and
a second connector configured to physically connect to the first connector, wherein the first and second connectors are configured to transport data and power directly between the controller module and the first I/O module.

2. The apparatus of claim 1, wherein:
the RTU further comprises a first expansion board;
a last I/O module of the I/O modules comprises a fifth connector;
the first expansion board comprises a sixth connector; and
the fifth connector is configured to be physically connected to the sixth connector, and the fifth and sixth connectors are configured to transport data directly between the last I/O module and the first expansion board.

3. The apparatus of claim 2, wherein:
the RTU further comprises a second expansion board configured to be coupled to the first expansion board and to one or more additional I/O modules, each additional I/O module comprising multiple additional I/O channels; and
the controller module is configured to communicate with at least one additional industrial field device via the additional I/O channels.

4. The apparatus of claim 3, wherein:
the first expansion board further comprises at least one port; and
the at least one port is configured to be coupled to the second expansion board in order to provide at least one communication path between the controller module and the one or more additional I/O modules.

5. The apparatus of claim 2, wherein:
the first expansion board further comprises first and second ports;
the controller module and the plurality of I/O modules are configured to communicate over multiple communication paths through connectors; and
the first and second ports are configured to be coupled together by a cable so that the multiple communication paths form a ring.

6. The apparatus of claim 1, wherein:
the plurality of I/O modules comprise a first string of I/O modules;
the RTU further comprises a second string of I/O modules;
only one power connection from a power supply is coupled to each of the first and second strings of I/O modules; and
only one or two data connections couple the first string of I/O modules to the second string of I/O modules.

7. The apparatus of claim 1, wherein only the first connector and the second connector couple the controller module and the first I/O module.

8. An apparatus comprising:
a controller module of a remote terminal unit (RTU), the controller module comprising:
at least one processing device configured to communicate with at least one industrial field device via input/output (I/O) channels of a plurality of I/O modules connected in series; and
a first connector configured to:
physically connect to a second connector of a first of the plurality of I/O modules; and
transport data and power directly between the controller module and the first I/O module, and
transport data and power indirectly between the controller module and a second I/O module, where the first I/O module comprises a third connector and the second I/O module comprises a fourth connector, and the third and fourth connectors are configured to transport data and power directly between the first I/O module and the second I/O module.

9. The apparatus of claim 8, wherein the first connector is configured to provide multiple communication paths for the data between the controller module and the first I/O module.

10. The apparatus of claim 9, wherein the controller module is configured to communicate with multiple I/O modules over the multiple communication paths.

11. The apparatus of claim 9, wherein the controller module is configured to communicate with multiple additional I/O modules coupled to an expansion module over the multiple communication paths.

12. The apparatus of claim 8, wherein the controller module further comprises I/O terminals and one or more built-in I/O channels configured to communicate via the I/O terminals.

13. An apparatus comprising:
an input/output (I/O) module of a remote terminal unit (RTU), the I/O module comprising:
multiple I/O channels configured to provide communication paths between a controller module of the RTU and at least one industrial field device;
first and second connectors configured to physically connect to other modules of the RTU, each connector configured to transport data and power directly between the I/O module and the other modules of the RTU,
the first connector configured to be physically connected to a third connector of a controller module and transport data and power directly between the I/O module and the controller module, and
the second connector configured to be physically connected to a fourth connector of an additional I/O module and transport data and power directly between the I/O module and the additional I/O module.

14. The apparatus of claim 13, wherein the first and second connectors are configured to provide multiple communication paths for the data to and from the I/O module.

15. The apparatus of claim 13, wherein:
the I/O module is configured to receive operating power through the first connector; and
the I/O module is configured to provide power through the second connector.

16. An apparatus comprising:
an expansion module of a remote terminal unit (RTU), the expansion module comprising:
a connector configured to be physically connected to an input/output (I/O) module of the RTU, the I/O module comprising multiple I/O channels configured to provide communication paths between a controller module of the RTU and at least one industrial field device;

at least one port configured to be coupled to a second expansion module of the RTU, the second expansion module configured to be coupled to an additional I/O module; and a set of I/O modules connected in series, each comprising multiple I/O channels;

wherein the connector is configured to:

transport data directly between the I/O module and the expansion module, and transport data and power indirectly between the controller module and a second I/O module, where the I/O module comprises a third connector and the second I/O module comprises a fourth connector, and the third and fourth connectors are configured to transport data and power directly between the I/O module and the second I/O module.

17. The apparatus of claim 16, wherein the at least one port is configured to be coupled to the second expansion module in order to provide at least one communication path between the controller module and the additional I/O module.

18. The apparatus of claim 16, wherein:

the at least one port comprises first and second ports; and the first and second ports are configured to be coupled together by a cable so that multiple communication paths between the controller module and the I/O modules form a ring.

19. The apparatus of claim 8, wherein only the first connector and the second connector couple the controller module and the first I/O module.

20. The apparatus of claim 13, wherein only the first connector and the second connector couple the controller module and the first I/O module.

* * * * *